S. D. BATES & S. W. MURRAY.
Screw-Cutting Dies.
No. 137,283.                         Patented April 1, 1873.
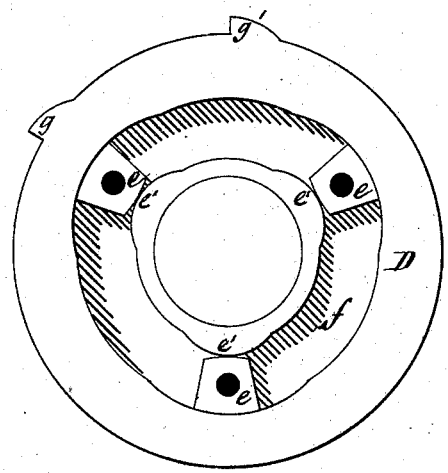
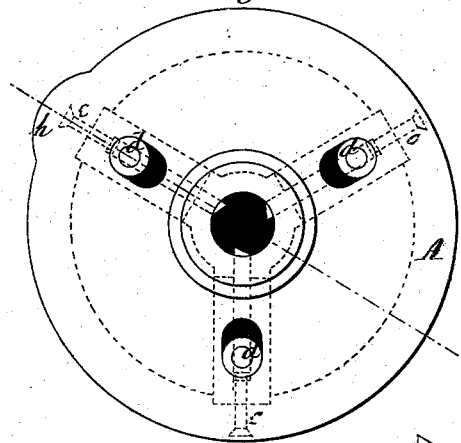
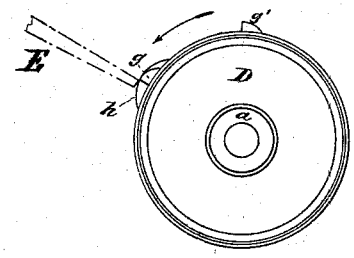
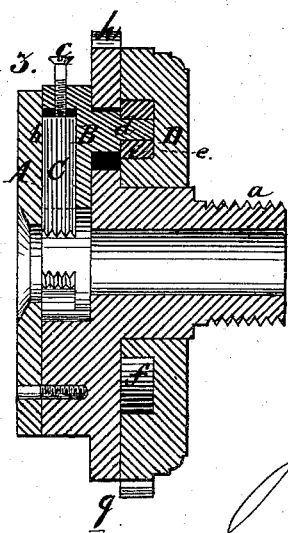
Witnesses:
Albert E. Norris
Wm J. Seyton
Inventors,
S. D. Bates & S. W. Murray
by
James L. Norris,
Attorney.

UNITED STATES PATENT OFFICE.

SAMUEL D. BATES, OF LEWISBURG, AND SAMUEL W. MURRAY, OF MILTON, ASSIGNORS TO MURRAY, DOUGALL & COMPANY, OF MILTON, PA.

IMPROVEMENT IN SCREW-CUTTING DIES.

Specification forming part of Letters Patent No. 137,283, dated April 1, 1873; application filed January 28, 1873.

*To all whom it may concern:*

Be it known that we, SAMUEL D. BATES, of Lewisburg, Union County, Pennsylvania, and SAMUEL W. MURRAY, of Milton, in the county of Northumberland and State of Pennsylvania, have invented certain new and useful Improvements in Screw-Cutting Dies, of which the following is a specification:

This invention consists of a cam-disk which actuates the cutting-dies, and which is provided with two stops on its circumference, and which turns freely on the hub of a chuck that carries the cutting-dies, and is provided on its circumference with a releasing-cam in such a manner that, when a suitable lever is brought to bear on the circumference of the chuck and cam-disk, the cutting-dies are caused to open and close automatically at suitable intervals to introduce the bolts or rods on which screws are to be cut; also to complete the screw-threads, and to remove one rod or bolt, and introduce another, after the thread on the first has been completed.

In the accompanying drawing, Figure 1 represents a detached inside view of the cam-disk which forms part of our invention. Fig. 2 is an inside view of the chuck which carries the cutting-dies. Fig. 3 is a central section of our invention. Fig. 4 is a plan view of the same.

The letter A designates a chuck which is provided with a screw-thread, $a$, to be fastened on the end of a lathe-spindle or arbor, to which a revolving motion can be imparted. Said chuck is provided with three radial grooves, $b$, to receive heads B, which contain the cutting-dies, said heads being constructed with set-screws $c$, by which the cutting-dies can be adjusted. From the inner surface of the heads project pins or studs $d$, which engage with blocks $e$, (see Figs. 1 and 3,) that are fitted in a cam-groove, $f$, in the disk D. This disk is provided with an internal hub having three or more enlargements or protuberances, $e'$ $e'$ $e'$, and turns freely on the hub of the chuck A, and the cam-groove $f$ is so shaped that when the chuck is revolved and the disk is held stationary the cutting-dies are caused to open and to close three times (more or less) for each revolution of the chuck, due chiefly to the blocks $e$ coming in contact with the protuberances $e'$. From the periphery of the cam-disk project two stops, $g$ $g'$, (see Figs. 1 and 4,) and from the periphery of the chuck A rises a cam, $h$, so that if a lever, E, or any equivalent device, is brought to bear upon the periphery of the cam-disk, said disk will be prevented from revolving with the chuck as soon as the lever strikes one of the stops $g$, and it (the disk) will not be released until the cam $h$ of the chuck raises the lever clear of the stop. The stops $g$ $g'$ are so situated in relation to the cam-groove $f$ that when the cam-disk is first arrested by the stop $g$, the cutting-dies are wide open for the introduction of a new rod or bolt. As the chuck revolves in the direction of the arrow marked thereon in Fig. 4, the cam $h$ on its circumference raises the lever E, and the cam-disk revolves until the lever strikes the second stop $g'$, when the cam-disk is again held stationary, causing the cutting-dies to close and open separately until the cam $h$ again raises the lever E, when the cam-disk rotates with the chuck nearly an entire revolution while the cutting-dies are closed. By these means the screw-thread is well developed, and as the stop-lever strikes the first stop $g$ the cutting-dies are operated, and the rod or bolt can be removed, a fresh one introduced, and the operation can continue with great rapidity.

We claim as our invention—

The cam-disk D, provided with stops $g$ $g'$, in combination with a chuck, A, carrying the cutting-dies, and provided with a releasing-cam, $h$, the whole being constructed and operating substantially in the manner shown and described.

In testimony that we claim the foregoing we have hereunto set our hands this 18th day of January, 1873.

SAMUEL D. BATES.
    SAMUEL W. MURRAY.

Witnesses:
 M. REESE DILL,
 W. C. DUNCAN.